Aug. 11, 1936.   D. E. GOMMEL   2,050,699
MITER BOX
Filed Aug. 19, 1935
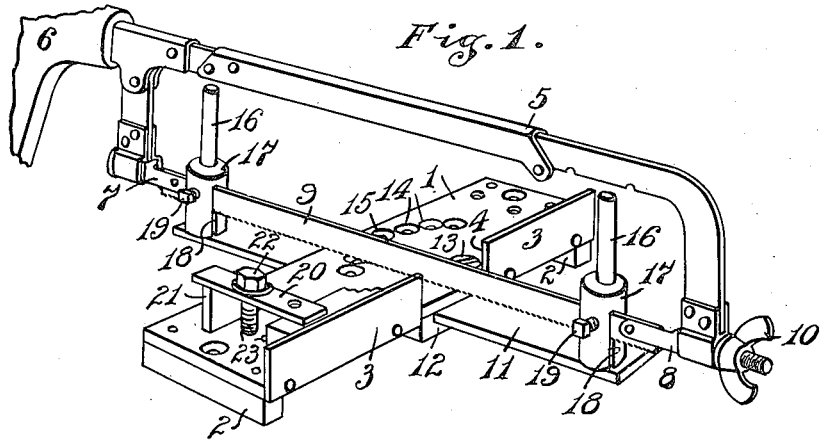
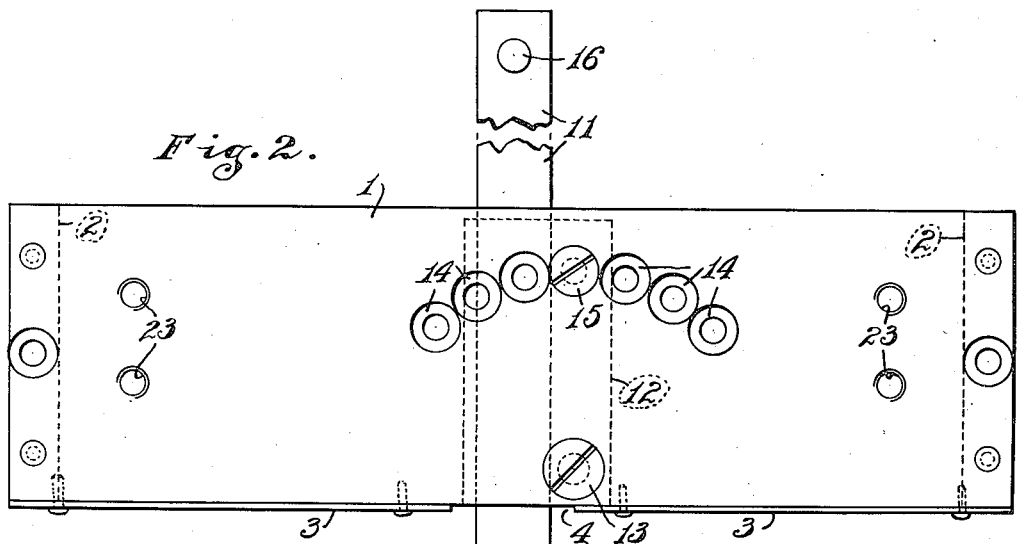
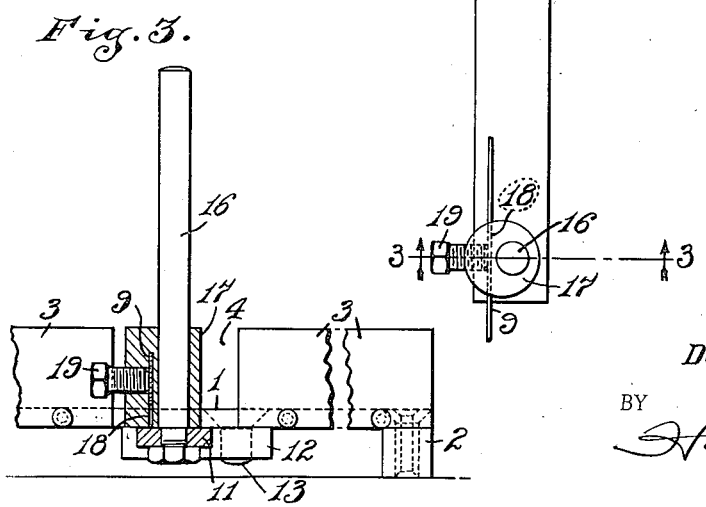
INVENTOR.
Dewey E. Gommel,
BY
Hood + Hahn
ATTORNEYS Patented Aug. 11, 1936

2,050,699

UNITED STATES PATENT OFFICE 2,050,699

MITER BOX

Dewey E. Gommel, Indianapolis, Ind., assignor to E. C. Atkins and Company, Indianapolis, Ind., a corporation of Indiana Application August 19, 1935, Serial No. 36,780

6 Claims. (Cl. 143—89)

My invention relates to improvements in miter boxes for saws and particularly for metal or hack saws.

One of the objects of my invention provides a miter box wherein the angle of cut for the saw may be readily obtained and which at the same time will permit all of the strain or tension in holding the saw blade straight to be taken by the hack saw frame instead of by the miter box.

For the purpose of disclosing my invention, I have illustrated an embodiment of the same in the accompanying drawing in which:

Fig. 1 is a perspective view of a miter box embodying my invention;

Fig. 2 is a partial plan view of the same; and

Fig. 3 is a sectional view taken on the line 3—3 of Fig. 2.

In the embodiment of the invention illustrated, I provide a base 1 which is preferably supported on a pair of downwardly extending end rails 2—2 disposed at the opposite end of the base 1. This base has an upwardly extending back brace 3 secured to the rear edge of the base and provided with a center opening 4.

The saw comprises the usual hack saw having the adjustable frame 5 provided with the usual handle 6 and with the blade holding studs 7 and 8 adapted to receive between the same the hack saw blade 9. The stud 8 is preferably adjustable by means of the thumb screw 10 for the purpose of tensioning the blade 9. This saw is supported on a guide member comprising a guide plate 11 which guide plate slides in a groove formed on the upper face of a supporting plate 12 secured to the bottom face of the base 1, by a set screw 13 extending through the base and into the supporting plate 12. At the front end of the base, I provide a series of screw openings 14 disposed in an arc and through any of which is adapted to be extended a set screw 15 taking into the forward end of the plate 12 whereby the angle of the plate may be adjusted, the plate swivelling on the screw 13. The guide or slide plate 11 has extending upwardly therefrom, at each end thereof, a pair of pins 16—16 over which fits a pair of spindles 17—17. Each of these spindles, at one side of the center thereof, is provided with a blade receiving slot 18 adapted to receive the blade 9 of the hack saw and set screws 19 extend through these spindles to grip the saw and hold the spindles to the saw. It is obvious that the saw and its associated spindle may move vertically on the posts 16 and that the saw may slide back and forth for cutting purpose with the slide plate 11 with all of the strain of the tension of the saw taken on the saw frame.

Also, it is obvious that the angle of the cut of the saw may readily be adjusted through the medium of the adjustment screws 15 as heretofore described.

For clamping the work in position on the base 1, I preferably provide a work clamp 20 which is adapted to rest upon the top of a blade 21 and adapted to receive a clamping screw 22 which takes into any of a series of threaded openings 23 formed in the top face of the base. The opposite end of the clamp bears on the top of the work, thus securely clamping the work in position during the sawing operation.

I claim as my invention:

1. In a miter box, the combination with a base, of a slide supported on said base and mounted to move relatively to said base, means for adjusting the angle of movement of said slide, a pair of blade engaging members mounted on said slide and vertically movable thereon and means for connecting said members to the blade of a saw.

2. In a miter box, the combination with a base, of a slide supported on said base, means for adjusting the angle of movement of said slide relatively to said base, a pair of vertically extending posts mounted on said slide and a pair of saw blade-engaging members supported on said posts and vertically movable thereon.

3. In a miter box, the combination with a base, of a slide support swivelled on the under face of said base, a slide carried by said support beneath said base and saw blade-engaging means carried by said slide and vertically movable thereon.

4. In a miter box, the combination with a base, of a slide support swivelly mounted on the under face of said base, a slide carried by said support, a pair of posts extending vertically from the opposite ends of said slide and a saw blade engaging member vertically movably mounted on each of said posts.

5. In a miter box, the combination with a base, of a slide support swivelly mounted on the under face of said base, a slide mounted on said support, a pair of vertically extending posts at the opposite ends of said slide, a pair of spindles supported on said posts and vertically movable thereon having slots therein for the reception of the saw blade.

6. In combination with a saw frame, of a blade held in tension in said frame, a base, an angularly adjustable slide supported on said base, and means vertically movable on said slide and connected to said tensioned blade.

DEWEY E. GOMMEL.